Sept. 8, 1953 T. O. KOSATKA 2,651,534
SEALING DEVICE
Filed June 15, 1949

INVENTOR.
Thomas O. Kosatka,
BY George J. Haight &
George H. Simmons
ATTYS

Patented Sept. 8, 1953

2,651,534

UNITED STATES PATENT OFFICE 2,651,534

SEALING DEVICE

Thomas O. Kosatka, Chicago, Ill., assignor to Victor Manufacturing & Gasket Co., Chicago, Ill., a corporation of Illinois Application June 15, 1949, Serial No. 99,134

5 Claims. (Cl. 288—3)

1

This invention relates to unitary fluid seals and has for its principal object the provision of a new and improved seal of this type.

It is a main object of the invention to provide a unitary fluid seal, for sealing the space between a shaft and a housing through which the shaft projects, that is relatively thin axially of the shaft.

Another object of the invention is to provide a thin unitary sealing device which incorporates the advantages of a flexible sealing element that is capable of maintaining a fluidtight seal between the relatively movable housing and shaft notwithstanding some eccentricity in the movement.

Another object of the invention is to provide a unitary thin sealing device in which the flexible contact with the shaft is maintained by a garter spring and which contains an arrangement for preventing the spring from being dislodged from the device during assembly upon the shaft.

Another object of the invention is to provide a unitary sealing device having an elastomer to metal contact with the bore in the housing to form and maintain a fluidtight seal therebetween and to support the sealing device in the bore.

Another object of the invention is to provide a unitary sealing device that can be easily registered with and properly installed in a bore in a housing without damage to either the sealing device or bore.

Still another object of the invention is to provide a unitary thin sealing device that can be manufactured at low cost without sacrificing quality.

Further objects, not specifically mentioned here, will be apparent from the detailed description and claims which follow, reference being had to the accompanying drawings in which a preferred embodiment of the invention is shown by way of example and in which:

2

Figure 1:
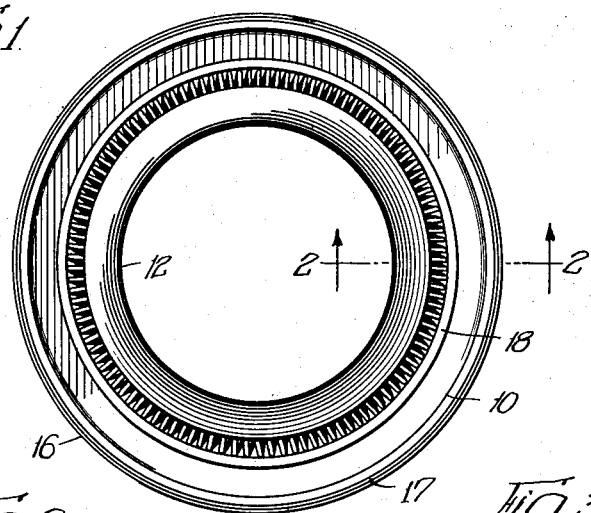
Figure 1 is a plan view of a sealing unit showing the invention.

In the prior art of which I am aware there are provided a number of unitary sealing devices adapted to form a fluidtight seal between a shaft and a bore in a relatively stationary housing or member through which the shaft projects. Certain of these prior art devices include a metallic shell which contains a flexible sealing element that is spring pressed against the shaft to form and maintain a fluidtight seal therewith, even though the movement of the shaft be somewhat eccentric with respect to the bore. These metal encased sealing devices are ground on their outer periphery to accurate dimensions to form a fluidtight metal to metal seal between the sealing device and the housing when the device is pressed into the bore.

Such devices, while eminently successful in solving the sealing problems for which they are designed, are relatively thick in a direction axially of the shaft, and in many instances this fact prevents the use of the sealing device since there is not sufficient room axially of a shaft to accommodate the metal encased seal. Such seals because of the number of parts going into them and the accuracy required are relatively expensive, and this fact further restricts the use of the device.

Also in the prior art of which I am aware are so-called thin seals that have much smaller thickness axially of the shaft than do the foregoing devices, thereby permitting use of the seal in many places where the metal encased seal will not fit. These prior art thin seals involve a metal supporting member, the outer periphery of which is ground accurately to size to form a fluidtight metal to metal joint with the housing, and the shaft engaging sealing member is designed to be maintained in sealing contact with the shaft solely by compression of the member between the shaft and the shell of the seal. Such devices function satisfactorily and have long life, where the shaft is truly concentric with the bore. Because of the close tolerances to be maintained the cost of such seals is relatively high and the use of the device correspondingly restricted.

Also in the prior art of which I am aware are numerous attempts to produce a thin seal that will maintain sealing contact with a shaft under conditions of eccentricity comparable to those satisfactorily met by the metal encased seal. However, insofar as I am aware none of these prior art devices has been altogether satisfactory.

In one instance in an effort to solve the problem an all elastomer sealing device was devised and an outer rim of elastomer, relatively thick radially, was compressed into the bore to support the sealing device therein, and to maintain a fluidtight seal between the device and the bore. The heat and pressure to which these devices were subjected soon caused changes in the elastomer, resulting in impairment of the fluidtight seal with the housing, and in certain instances loosening of the device to such an extent that it rotated in the bore rather than remaining stationary therein as intended.

Efforts to overcome this difficulty have resulted in an all elastomer seal in which the outer rim of the device is reenforced by a metallic ring of rectangular or L-shaped section partially or wholly embedded in the elastomer. Such devices while an improvement on the all elastomer device still have not been sufficiently long lived to be considered completely satisfactory.

The present invention offers a solution of the problem of providing a thin seal capable of maintaining fluidtight seal with a shaft under conditions of slight eccentricity in the shaft which approaches the problem from an angle entirely different from the angle of approach of the prior art of which I am aware. In its preferred form the device of the present invention consists of a metallic shell of either L or U-shaped cross section drawn by ordinary production methods with usual commercial tolerances to a diameter slightly less than that of the bore so that the shell will fit in the bore easily. Attached to the outer surface of this shell preferably by bonding, is a thin layer of elastomer, the radial thickness of which is preferably less than the thickness of the metal in the shell. The outer diameter of this layer of elastomer is molded accurately to a dimension greater than the diameter of the bore by an amount sufficiently great to cause the elastomer to be compressed throughout its radial thickness as the device is forced into the bore.

In order to guard against the possibility of the bond between this outer wall of elastomer and the metal being damaged during insertion of the device in the bore a small band of the elastomer adjacent the leading edge of the device is thinner than the remainder of the wall and molded to an outside diameter slightly less than the diameter of the bore so that it will have a sliding fit in the bore.

The device of the present invention is also equipped with a spring pressed sealing lip that is of the same general design as used in the thicker metal encased seals, and this lip is maintained in sealing engagement with the shaft by a garter spring, the same as in the thicker seals. To guard against the possibility of the garter spring being dislodged from the device during placement of the seal upon the shaft, means for holding the garter spring in place under these conditions is provided.

The device of the present invention provides a relatively cheap thin seal capable of maintaining fluidtight sealing contact with a shaft under conditions of eccentricity of the shaft as great as can be met by metal cased seals. The fluidtight seal between the sealing device and the housing and the firm support of the sealing device in the bore are both satisfactory over long periods of time and under maximum operating temperature conditions likely to be encountered in the uses to which the device is adaptable.

Figure 2:
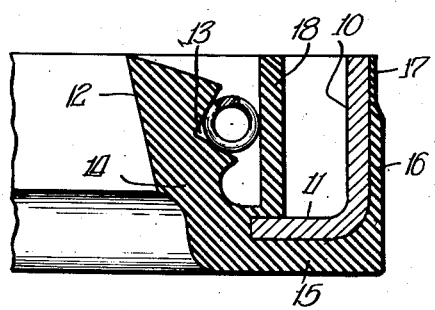
Figure 2 is a fragmentary cross sectional view taken substantially along the line 2—2 of Figure 1 looking in the direction of the arrows and drawn to an enlarged scale.

Referring now to the drawings in more detail, particularly Figures 1 and 2, it will be seen that in the embodiment therein shown, the sealing device consists of a cup-like metallic member having a cylindrical outer wall 10 from one end of which an annular wall 11 is projected inwardly. This shell is formed by ordinary production drawing methods and maintained to size within the range of commercial tolerances. No further finishing of the shell is required other than cleaning and degreasing preparatory to coating the member so as to permit bonding the elastomer to it.

Bonded to the shell member is an elastomer having a sealing lip 12 on the outer edge of which is a garter spring groove 13, this portion of the elastomer being connected through a relatively flexible neck 14 to a base portion 15 that extends across the bottom outer surface of the annular wall 11, and into an outer cylindrical section 16 that is bonded to the outer surface of the cylindrical wall 10 and extends completely thereacross. The section 16 of the wall contains a thinner band-like marginal portion 17 located adjacent the free edge of wall 10.

An extension of the elastomer is bonded to the upper surface of the annular wall 11 adjacent the inner edge thereof, and extends upwardly therefrom to form an inner cylindrical member 18 that terminates substantially in alignment with the upper edge of the sealing lip and cylindrical wall 10. This member 18 being in juxtaposition to or in contact with the garter spring, serves to hold the garter spring in its groove during the placing of the seal upon the shaft and also during operation of the seal.

As will be seen clearly in Figure 2 the outer cylindrical wall 16 of elastomer is relatively thin. In the example shown it is thinner radially than the wall 10. The maximum thickness desired in this outer wall 16 is the thickness of the wall 10.

Figure 3:
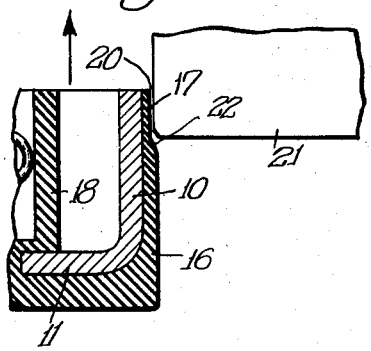
Figure 3 is a fragmentary cross sectional view similar to Figure 2 and illustrating the lead-in of the sealing unit in the bore.

With the outer dimensions of the shell wall 10 designed to be several thousandths of an inch less than the bore in the housing, variations in this dimension within the limits of commercial tolerances necessary for commercial production of articles of this kind will cause the fit between the shell and the bore to vary from a snug to a loose sliding fit. By maintaining the thickness of the outer elastomer wall 16 approximately equal to and no greater than the thickness of the cylinder wall 10 of the shell, the outer diameter of this wall 16 will be greater than the diameter of the bore by from four to ten thousandths of an inch, depending upon the diameters involved. The lead-in band 17 being substantially thinner than the remainder of the cylinder wall will fit into the bore with little or no compression of the elastomer as indicated by the space 20 (Fig. 3).

As the sealing device is moved in the direction of the arrow the edge of the housing 21 striking against the inclined or bevelled junction line 22 between the sections 16 and 17 of the wall will stress the bond between the elastomer and metal wall 10, and will stress the portion 17 of the elastomer in tension, thereby effectively distributing the stresses tending to tear or shear the elastomer from the metal over an area extending from the free edge of the shell to a point in alignment with the point of contact of the housing with the bevelled portion 22. Through this arrangement the main wall of the elastomer 16 can be made sufficiently larger than the inside diameter of the bore to insure complete compression of the elastomer wall throughout its radial thickness without tearing the elastomer from the metal as the sealing device is being pushed into place in the bore. Such complete compression of the relatively thin wall of elastomer forms a fluidtight seal between the housing and the device, and firmly and rigidly holds the device in the bore against torques placed on it by the rotation of the shaft, and the seal thus formed will be maintained for a long period of time under extreme conditions of operating temperatures, no tendency of the seal to loosen and leak having been observed under extremely severe conditions.

Figure 4:
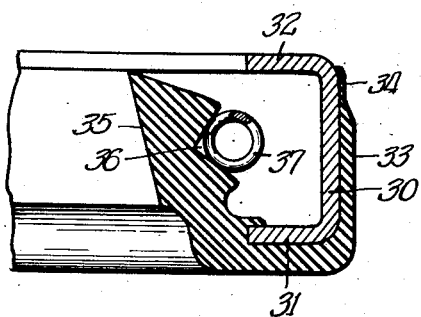
Figure 4 is a view similar to Figure 2 and showing a modified form of the invention.

In the embodiment of the invention shown in Figure 4 the sealing device comprises a metal shell having an outer cylindrical wall 30 and radially inwardly extending annular flanges 31 and 32. An elastomer is bonded to the outer wall and one flange as before, the outer wall having a main portion 33 and a lead-in portion 34. The sealing lip 35 and spring groove 36 are the same as in Figures 1 and 2, however the inner cylindrical wall of elastomer is omitted. The garter spring, 37, is retained in the device by the flange 32, the inner edge of which is disposed in juxtaposition thereto.

The metallic shell in this form of the invention is stiffer than in the embodiment shown in Figure 1 by reason of the double flanges thereby rendering the device particularly adaptable to use with larger diameter shafts and bores, in instances where the radial distance between the shaft and bore is small. Since the flange 32 is rolled into the position shown, after the elastomer has been molded onto the shell, and since the maximum length of metal that can be rolled from cylindrical to annular shape without buckling is small, the maximum radial width of the flange 32 is correspondingly limited.

Figure 5:
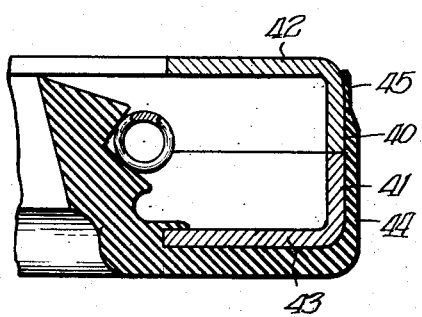
Figure 5 is a view similar to Figure 4 showing still another embodiment of the invention.

In the embodiment of the invention shown in Figure 5, the structure of Figure 4 is modified by forming the metallic wall of two flanged rings of L-section, the cylindrical portions 40 and 41 of which are aligned to form the outer cylindrical wall of the device, from the opposite edges of which annular walls 42 and 43 project radially inwardly. The elastomer, which is the same as in Figure 4, has an outer cylindrical section 44, and a lead-in ring or band 45, the relative characteristics of which are the same as explained in connection with Figure 2.

Since the flanged rings 40 and 41 are formed separately, prior to molding, the radial widths of flanges 42 and 43 can be made to any desired dimensions, and the embodiment shown in Figure 5 is adaptable to use where the space between the shaft and the bore is greater than can be spanned by the rolled over flange of Figure 4. Drawing rings of L-section is less expensive than rolling a flange and the device shown in Figure 5 is less costly to produce.

The sealing device of the present invention presents a solution to the problem of a relatively inexpensive thin seal capable of maintaining fluidtight sealing contact with a shaft under conditions of slight eccentricity. The use of an outer cylindrical wall of elastomer thin enough to be capable of being compressed completely in a radial direction, forms a long lasting fluidtight rigid support of the device in a bore, and permits commercial manufacture of the metallic parts of the seal within commercial tolerances and eliminates the costly grinding of the metal to accurate dimension as is required in the case of metal to metal contact. The sealing device of the present invention can be manufactured at lost cost, thereby adapting it to many uses in which the cost of comparable prior art sealing devices has been prohibitive.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. A device for sealing the space between a shaft and a bore in a housing through which the shaft projects comprising: a metallic shell, an outer cylindrical wall of said shell having an outside diameter slightly less than the diameter of the bore; a thin hollow cylinder of elastomer bonded to the outside surface of said wall, said elastomer being no thicker than the metal in said shell and the outer face of said elastomer cylinder having a diameter greater than the diameter of the bore; a cylindrical section of said elastomer adjacent one end of said metallic wall thinner than the remainder of the elastomer and having an outside diameter no greater than the diameter of the bore, and connected to said greater diameter part of the elastomer by a tapered surface; said section forming a lead-in ring that facilitates registering the shell with the bore and resists shearing stresses on the bond as the remainder of the cylinder is forced into the bore and the elastomer therein is displaced to support the shell in fluidtight engagement with the housing; and means supported on the shell and engaging the shaft for forming a fluidtight seal between the shell and the shaft.

2. In a device for sealing the space between a shaft and a bore in a housing through which the shaft projects; a metallic cylindrical ring having an outside diameter slightly less than the diameter of the bore; a layer of elastomer bonded to the outer surface of said ring and having a thickness no greater than the thickness of said ring and an outside diameter slightly greater than the diameter of the bore; a cylindrical section of said layer thinner than the rest of the layer and having an outside diameter slightly less than the diameter of the bore and length sufficient to form a lead-in band for centering the device in the bore; an integral extension of said elastomer projecting radially inwardly from said ring and terminating in a shaft engaging lip; and a greater spring engaging the elastomer and tensioned to maintain said lip in seal forming engagement with the shaft.

3. A device for sealing the space between a shaft and a bore in a housing through which the shaft projects comprising: a metallic shell containing a cylindrical wall of outside diameter, within commercial tolerances, to fit loosely in said bore, and an annular portion extending inwardly from one end of said wall; an elastomer member bonded to the outer face of said annular portion and extending inwardly therefrom into seal forming engagement with the shaft, an elastomer cylinder integral with said member and bonded to the outer surface of said cylindrical shell wall and extending partially across said wall and having an outside diameter greater than the diameter of the bore; a cylindrical elastomer lead-in ring integral with said elastomer cylinder and bonded to said wall between the end of said elastomer cylinder and the free end of said wall, said lead-in ring having an outside diameter smaller than the bore so that as the device is inserted in the bore the lead-in ring centers the device in the bore; a bevelled outer surface connecting the lead-in ring with said elastomer cylinder, which surface is engaged by the edge of the housing and as the device is pressed into the bore displaces the elastomer cylinder towards the closed end of the device and stresses it in tension to form a fluid-tight seal with the bore, said stresses being distributed through the elastomer cylinder and sealing ring to prevent shearing the bond between the elastomer member and the metallic shell.

4. A sealing device as specified in claim 3, in which the sealing element portion engaging the shaft contains a V-notch in its outer periphery, a garter spring disposed in said notch tensioned to maintain the element in sealing engagement with the shaft; and a cylindrical elastomer wall, integral with said elastomer element and extending from the inner edge of the annular portion of said shell concentrically with the shell, and engaging said garter spring to maintain the same in said V-notch.

5. A device for sealing the space between a shaft and a bore in a housing through which the shaft projects comprising: a cup-like metallic shell; means on the outer wall of said shell for forming a fluid-tight seal with the bore; an elastomer member bonded to said shell and projecting therefrom as a sealing lip adapted to form a fluid-tight seal with the shaft; a V-notch in the outer surface of said sealing lip; a garter spring disposed in said notch and tensioned to maintain the lip in engagement with the shaft; and a cylindrical wall of elastomer integral with said member and disposed concentrically of said shell and engaging the garter spring to maintain the same in said V-notch.

THOMAS O. KOSATKA.

References Cited in the file of this patent

UNITED STATES PATENTS

| Number | Name | Date |
|---|---|---|
| 2,208,482 | Victor | July 16, 1940 |

FOREIGN PATENTS

| Number | Country | Date |
|---|---|---|
| 555,100 | Great Britain | Aug. 8, 1943 |
| 877,957 | France | Sept. 21, 1942 |